(12) United States Patent
Fan et al.

(10) Patent No.: US 11,403,680 B2
(45) Date of Patent: Aug. 2, 2022

(54) METHOD, APPARATUS FOR EVALUATING REVIEW, DEVICE AND STORAGE MEDIUM

(71) Applicant: Baidu Online Network Technology (Beijing) Co., Ltd., Beijing (CN)

(72) Inventors: Miao Fan, Beijing (CN); Yue Feng, Beijing (CN); Mingming Sun, Beijing (CN); Ping Li, Beijing (CN); Haifeng Wang, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 444 days.

(21) Appl. No.: 16/421,921

(22) Filed: May 24, 2019

(65) Prior Publication Data

US 2019/0287142 A1 Sep. 19, 2019

Related U.S. Application Data

(63) Continuation of application No. PCT/CN2018/104816, filed on Sep. 10, 2018.

(51) Int. Cl.
| | |
|---|---|
| *G06F 40/131* | (2020.01) |
| *G06F 40/279* | (2020.01) |
| *G06Q 30/02* | (2012.01) |
| *G06K 9/62* | (2022.01) |
| *G06Q 30/06* | (2012.01) |
| *G06F 40/30* | (2020.01) |

(52) U.S. Cl.
CPC ......... *G06Q 30/0282* (2013.01); *G06F 40/30* (2020.01); *G06K 9/6263* (2013.01); *G06Q 30/0627* (2013.01)

(58) Field of Classification Search
CPC ...... G06F 15/16; G06F 17/30; G06F 16/9535; G06F 40/268; G06F 40/295
See application file for complete search history.

(56) References Cited

U.S. PATENT DOCUMENTS 8,554,769 B1 * 10/2013 Thakur ................. G06F 16/951
707/735
9,047,283 B1 * 6/2015 Zhang .................. G06F 40/205
(Continued)

FOREIGN PATENT DOCUMENTS

CN 104572892 A 4/2015
CN 106156196 A 11/2016
(Continued)

*Primary Examiner* — Olujimi A Adesanya
(74) *Attorney, Agent, or Firm* — Nixon Peabody LLP (57) ABSTRACT

According to an exemplary embodiment of the present disclosure, a method, apparatus for evaluating a review, a device and a computer readable storage medium are provided. The method for evaluating a review includes obtaining a first vectorized representation of a set of text items in a review for a target object. The method further includes extracting a semantic feature of at least two consecutive text items of the set of text items based on the first vectorized representation. The method further includes determining a degree of importance of the at least two consecutive text items in a context of the review, and determining a degree of the review helping a user to evaluate the target object, based on the degree of importance and the semantic feature. In this way, an automatic, efficient, and accurate evaluation of the value of a review may be achieved.

15 Claims, 4 Drawing Sheets

(56) References Cited

U.S. PATENT DOCUMENTS

| | | | | |
|---|---|---|---|---|
| 9,145,943 | B2* | 9/2015 | Sicking | E01F 15/145 |
| 9,201,927 | B1* | 12/2015 | Zhang | G06F 40/30 |
| 9,367,608 | B1 | 6/2016 | Zhang | |
| 9,659,084 | B1* | 5/2017 | Zhang | G06F 16/338 |
| 9,672,555 | B1* | 6/2017 | Dillard | G06Q 30/0282 |
| 9,852,215 | B1* | 12/2017 | Sullivan | G06F 16/36 |
| 10,268,676 | B1* | 4/2019 | Meisner | G06F 40/232 |
| 10,387,464 | B2* | 8/2019 | Weston | G06F 16/334 |
| 10,771,424 | B2* | 9/2020 | Kapoor | G06F 16/3346 |
| 2007/0250319 | A1* | 10/2007 | Tateishi | G10L 15/26 |
| | | | | 704/251 |
| 2008/0133488 | A1* | 6/2008 | Bandaru | G06F 16/951 |
| 2009/0287642 | A1* | 11/2009 | Poteet | G06Q 30/02 |
| 2012/0272160 | A1* | 10/2012 | Spivack | H04L 51/32 |
| | | | | 715/752 |
| 2013/0268457 | A1* | 10/2013 | Wang | G06Q 30/0203 |
| | | | | 705/347 |
| 2014/0304814 | A1* | 10/2014 | Ott | G06F 21/552 |
| | | | | 726/22 |
| 2017/0220579 | A1* | 8/2017 | Kazi | G06F 40/284 |
| 2017/0235848 | A1* | 8/2017 | Van Dusen | G06N 20/00 |
| | | | | 705/12 |
| 2020/0401852 | A1* | 12/2020 | Fan | G06N 3/084 |

FOREIGN PATENT DOCUMENTS

| | | |
|---|---|---|
| CN | 106570525 A | 4/2017 |
| CN | 107025299 A | 8/2017 |
| CN | 107368613 A | 11/2017 |
| CN | 107608956 A | 1/2018 |

* cited by examiner

METHOD, APPARATUS FOR EVALUATING REVIEW, DEVICE AND STORAGE MEDIUM

CROSS-REFERENCE TO RELATED APPLICATIONS

This is a continuation of International Application PCT/CN2018/104816, with an international filing date of Sep. 10, 2018, which claims priority to Chinese Patent Application No. 201810146882.0, filed on Feb. 12, 2018, titled "Method, Apparatus for Evaluating a Review, Device and Storage Medium," the content of which is hereby incorporated by reference in its entirety.

TECHNICAL FIELD

Embodiments of the present disclosure relate to the field of interaction, specifically to a method, apparatus for evaluating a review, a device and a computer readable storage medium.

BACKGROUND

With the development of network technology, more and more Internet platforms support the generation of user-generated content (UGC). Therefore, users may publicly make reviews on specific objects on many Internet platforms. Such reviews not only enrich the relevant information of the reviewed objects (e.g., products, services, or contents such as news, videos, or short texts), but also help other users to understand the qualities, characteristics, etc. of the reviewed objects.

Since reviews are usually generated autonomously by the users, not all of the reviews can provide other users with useful or valuable information about the reviewed object, and some reviews may even be completely unrelated to the reviewed object. If the number of reviews of the reviewed object is too large, then useful reviews are mixed with useless reviews, and thus other users may have difficulty in obtaining useful information quickly from the numerous reviews. In addition, useless information is also not conducive to the correct evaluation (e.g., whether it is worth recommending, etc.) of the reviewed object by the provider or other third parties. Therefore, it is desired that the value or usefulness of a review can be distinguished.

SUMMARY

According to an exemplary embodiment of the present disclosure, a solution for evaluating a review is provided.

In a first aspect of the present disclosure, a method for evaluating a review is provided. The method includes obtaining a first vectorized representation of a set of text items in a review for a target object. The method further includes extracting a semantic feature of at least two consecutive text items of the set of text items based on the first vectorized representation. The method further includes determining a degree of importance of the at least two consecutive text items in a context of the review, and determining a degree of the review helping a user to evaluate the target object, based on the degree of importance and the semantic feature.

In a second aspect of the present disclosure, an apparatus for evaluating a review is provided. The apparatus includes a representation obtaining module, configured to obtain a first vectorized representation of a set of text items in a review for a target object. The apparatus further includes a feature extraction module, configured to extract a semantic feature of at least two consecutive text items of the set of text items based on the first vectorized representation. The apparatus further includes a degree of importance determination module, configured to determine a degree of importance of the at least two consecutive text items in a context of the review, and a review evaluation module, configured to determine a degree of the review helping a user to evaluate the target object, based on the degree of importance and the semantic feature.

In a third aspect of the present disclosure, a device is provided, including: one or more processors; and a storage apparatus, for storing one or more programs, the one or more programs, when executed by the one or more processors, cause the one or more processors to implement the method according to the first aspect of the present disclosure.

In a fourth aspect, a computer readable storage medium is provided, storing a computer program thereon, the computer program, when executed by a processor, implements the method according to the first aspect of the present disclosure.

It should be understood that the content described in the Summary is not intended to limit the key or important features of the embodiments of the present disclosure, and is not intended to limit the scope of the present disclosure. Other features of the present disclosure will be readily understood through the following description.

BRIEF DESCRIPTION OF THE DRAWINGS

The above and other features, advantages and aspects of the various embodiments of the present disclosure will become more apparent after reading the following detailed descriptions in combination with the accompanying drawings. In the accompanying drawings, the same or similar reference numerals indicate the same or similar elements, in which.

DETAILED DESCRIPTION OF EMBODIMENTS

The embodiments of the present disclosure will be further described below in detail in combination with the accompanying drawings. Although certain embodiments of the present disclosure are shown in the accompanying drawings, it should be appreciated that the present disclosure may be implemented in various forms and should not be construed as limited to the embodiments set forth herein. Conversely, the embodiments are provided to provide a more thorough and complete understanding of the present disclosure. It should be appreciated that the accompanying drawings and embodiments of the present disclosure are to be considered as illustrative only and not limiting the scope of the present disclosure.

In the description of the embodiments of the present disclosure, the term "comprise" and its equivalents is to be understood as open-ended, i.e., "including but not limited to". The term "based on" should be understood as "based at least in part." The term "an embodiment" or "the embodiment" should be understood as "at lease one embodiment." The terms "first," "second," and the like may refer to different or identical objects. Other explicit and implicit definitions may also be included below.

As mentioned above, it is desired that the value or usefulness of the reviews of a particular object can be distinguished. In current applications, many platforms (such as Internet sites) that display reviews use crowdsourcing to determine the value of a review, i.e., encouraging other Internet users to manually vote on the value of the review. However, since this requires extra efforts by the users browsing the review, statistics show that the percentage of reviews that get the users' labelling about value is low. It is often more common for a reviewer (for example, a user who purchases a product or service) to subjectively rate the product or service based on satisfaction (for example, a subjective score from 1 to 5 stars). Other users often tend to label less about the value of the review itself.

In addition, there is another problem with the solution of value labeling by crowdsourcing. For some of the best-selling or popular products, services, or contents, they may attract a large number of users to participate in reviewing and to label the value of the reviews. However, for new or less popular products, services, or contents, it may be difficult to quickly collect manual labelling (votes) about the value of the reviews by crowdsourcing. For a specific platform, best-selling or popular products, services, or contents tend to be a small fraction, and most of the objects are still distributed in the "long tail" that is not being noticed.

Although some evaluation solutions have been developed for the automatic evaluation of the value of a review, these solutions still rely heavily on a large number of linguistic analysis tools. Specifically, many solutions first use different linguistic analysis tools to perform text analysis on messages, manually select and extract features of different aspects (part-of-speech tagging, grammar, emotions, semantic features, etc. of a review text), then train support vector machine (SVM), random forest and other machine learning classification models using these manually defined features, and finally apply the trained models to the identification and judgment of the value of the message.

These solutions may be divided according to the extracted different aspects of features. Some solutions are based on the extrinsic structural features of the review text, and such features include scoring and rating of the reviewed target, number of sentences in the message text, average sentence length, number of words in each sentence, or the like. Some solutions are based on the lexical features of the review text, and such features include the frequency of occurrence of consecutive substrings of different lengths (lengths 1, 2, 3), and the corresponding value of term frequency-inverse document frequency (TFIDF) obtained by calculation. Some solutions are based on the part-of-speech tagging feature of the review text, that is, perform part-of-speech tagging on the words in the review text one by one using a linguistic tool, and count the frequency of occurrence of various part-of-speech features such as nouns, verbs, adjectives or adverbs. Some solutions are based on the emotional features of the review text, that is, using the sentiment dictionary to perform emotional classification on the words of the review, and count the co-occurrence of these emotional categories as the features. There are also some solutions based on the semantic features of the review text, that is, using the semantic dictionary to perform semantic category classification on the words of the review, and count the co-occurrence of these semantic categories as the features.

In general, conventional automatic value evaluation solutions all rely on linguistic analysis tools, which may lead to many limitations. First, many linguistic analysis tools are difficult to guarantee the accuracy of the analysis of the target language. Secondly, multi-language application scenarios may result in the purchase and development costs of a plurality of linguistic analysis tools. In addition, whether the features extracted by the linguistic analysis tools are conducive to the identification of the value of the review is inconclusive. Even if some effective features are defined by experts, this may also be limited to a specific category of a language environment, resulting in insufficient versatility. As a result, these solutions often fail to accurately discover high-value reviews.

According to an embodiment of the present disclosure, a solution for evaluating the value of a review is proposed. In this solution, a review for a target object is divided according to a specific granularity to obtain a set of text items. A vectorized representation of the set of text items is obtained, and semantic features of at least two consecutive text items of the set of text items are extracted based on the vectorized representation. In addition, the degree of importance of the at least two consecutive text items in the context of the review is also determined. The determined degree of importance and the semantic features are used together to determine the degree of the review in helping a user to evaluate the target object. In this way, an automatic, efficient, and accurate evaluation of the value of a review may be achieved.

The embodiments of the present disclosure will be specifically described below with reference to the accompanying drawings.

Figure 1:
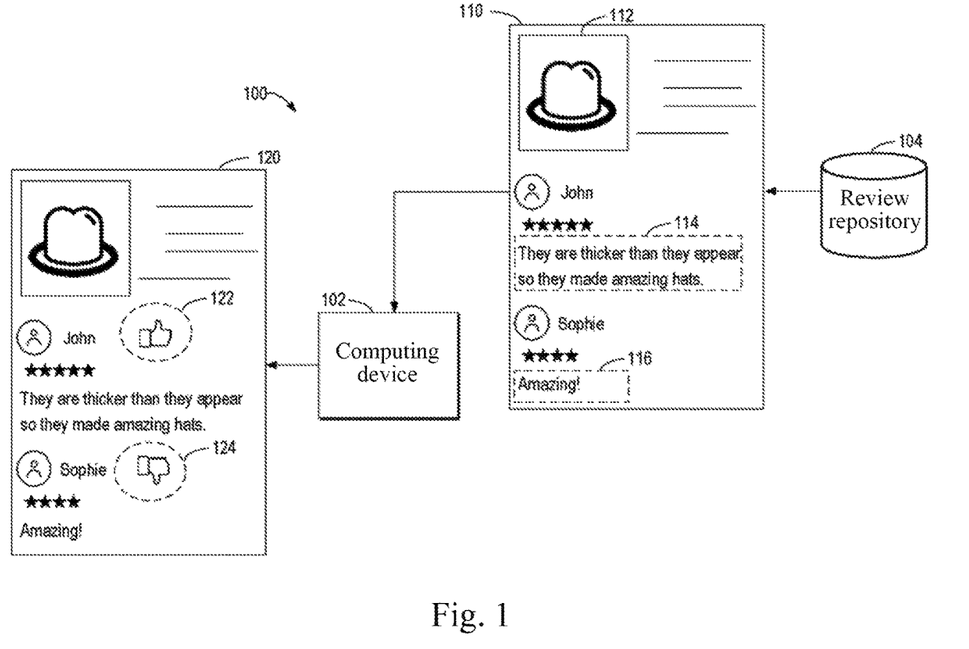
FIG. 1 illustrates a schematic diagram of an exemplary environment in which various embodiments of the present disclosure may be implemented.

FIG. 1 illustrates a schematic diagram of an exemplary environment 100 in which the various embodiments of the present disclosure may be implemented. In the example environment 100, the degree of a review for a target object in helping a user to evaluate the object (also referred to as the value or usefulness of the review) is evaluated by a computing device 102.

In the embodiments of the present disclosure, a review may also be referred to as a comment, a message, a reply, etc., referring to a content (e.g., an opinion, a suggestion, an evaluation, or a viewpoint) related to an object or a certain type of object. Such object may be a physical or virtual object such as a product, a service, a content of a specific form (news, video, short text, etc.) A review is usually written by an appropriate reviewer and submitted to a specific website host. In the embodiments of the present disclosure, discussions are made on the basis of reviews given in text form. In some cases, reviews may also include contents in the form of audio, video, image, etc. For these situations, contents in the form of audio, video, image, etc. may be converted to the text form.

The computing device 102 may retrieve a review for the target object from a review repository 104. Such review may be presented on a web page of an Internet website. For example, in the example of FIG. 1, the computing device 102 retrieves a web page 110 from the review repository 104, and the web page 110 includes one or more reviews

114, 116 for a target object "hat" 112, which are given by corresponding reviewers "John" and "Sophie", respectively.

The computing device 102 may extract the corresponding reviews 114 and/or 116 from the web page 110 and then determine, based on the embodiments of the present disclosure, the degree of the reviews 114 and/or 116 helping the user to evaluate the target object 112. In the embodiments of the present disclosure, the degree of a review helping a user to evaluate a particular object is also referred to as the value or usefulness of the review. In this article, the degree of a review helping a user to evaluate a particular object, the value or the usefulness of a review may be used interchangeably. Generally, the user desires to be able to evaluate, understand, or perceive one or more aspects (such as quality, characteristics, functionality, advantages and disadvantages, and details) of a particular object from reviews given by reviewers. If a review contain information about these aspects, the user tends to consider that the review is valuable or useful. Otherwise, the review may be considered as worthless or useless. According to the embodiments of the present disclosure, a value evaluation on a review for the target object is automatically implemented by the computing device 102.

The computing device 102 may output a value evaluation result of the reviews 114 and/or 116. The value evaluation result may include a judgment on whether the review is valuable (e.g., 0 or 1), or may be indicated by a value within a predetermined range of metric values (e.g., a value from the range of −5 to 5) to determine the degree of valuable or valueless. In some embodiments, the value evaluation result of the review may be presented in association with the review. The presentation of the value evaluation result may include one or more forms of text, graphic, icon, image, video or audio. In the example of FIG. 1, the computing device 102 outputs a web page 120. Compared with the web page 110, the computing device 102 labels the review 114 with a "useful" identifier 122 in the web page 120, indicating that the review 114 helps the user to evaluate the target object 112. The review 116 is labeled with a "useless" identifier 124, indicating that the review 116 does not help the user to evaluate the target object 112.

It should be understood that the web pages 110, 120 shown in FIG. 1 are merely examples, and FIG. 1 illustrates only one possible application scenario of the embodiments of the present disclosure. In other embodiments, the computing device 102 may only receive the content of the reviews, rather than the web page that records the reviews, and may only provide the value evaluation result. Such value evaluation result may also be used by the third parties, such as the provider of the target object, and Internet platforms having review systems, for the associated presentation with the reviews, or for other purposes, such as product promotion, and prioritized display of useful reviews.

Figure 2:
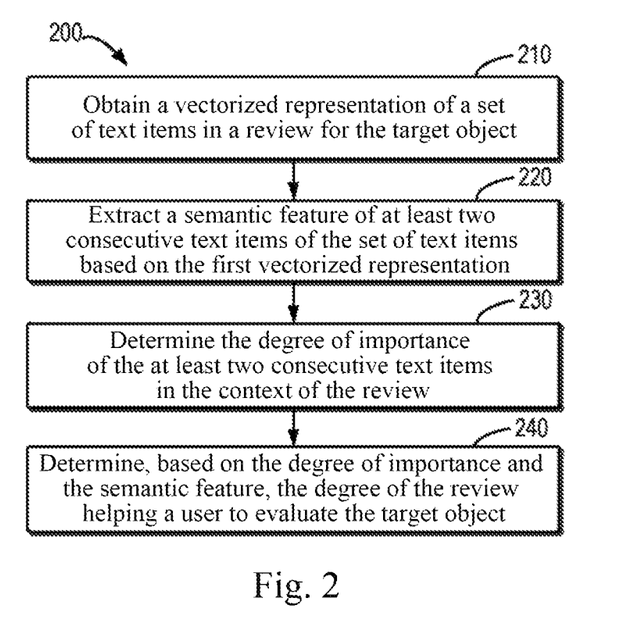
FIG. 2 illustrates a flowchart of a process of evaluating a review according to some embodiments of the present disclosure.

In order to more clearly understand the solution of automatically evaluating a review provided by the embodiments of the present disclosure, a detailed description will be made with reference to FIG. 2. FIG. 2 illustrates a flowchart of a process 200 of evaluating a review according to some embodiments of the present disclosure. The process 200 may be implemented by the computing device 102 of FIG. 1. For ease of discussion, the process 200 will be described with reference to FIG. 1.

At 210, the computing device 102 obtains a vectorized representation (referred to as the first vectorized representation for ease of discussion) of a set of text items in a review for the target object. After obtaining the review for the target object, the computing device 102 may divide the review by a certain granularity to obtain one or more text items. In some embodiments, all of the content included in the review may be divided to identify the text items therein.

The granularity for dividing the text items may be related to the language of the text of the review. For example, if the review contains text consisting of Latin Pinyin such as English, French or German, the review may be divided by word level to obtain the text items. Each text item includes a word in the review. If the review contains hieroglyphics such as Chinese or Japanese, the review may be divided by phrase level (or vocabulary level), and each text item may include a set of words (which may contain one or more words) in the review. For Chinese, Japanese, or other text content that cannot be divided by a specific identifier such as a space, some word segmentation tools may be used to implement the division of the text items.

It may be appreciated that the review may also be divided by other granularities to obtain the corresponding text items as needed. The number of text items obtained by dividing depends on the content contained in the review. Taking the division of the review 114 as an example, since the review 114 contains English text, it may be divided by word-level granularity, each text item including a single word in the review 114. If a Chinese review is divided, each text item may include one or more Chinese characters.

A vectorized representation of a text item may also be referred to as a vector encoding of a text item. The vectorized representation of the text item may consist of a plurality of values of a certain dimension. The vectorized representations of different text items may have the same dimension, but the values contained are different. The similarity between the vectorized representations of the text items may also indicate the semantic similarity between different text items. In the embodiments of the present disclosure, by performing processing such as mapping text information into a vectorized representation, differences between languages may be effectively avoided, and application limitations are reduced.

In some examples, a vectorized representation of a text item may be obtained from a predefined set of vector encodings (codebook). The predefined codebook may be vectorized representations of the text items determined after encoding the text items in the thesaurus. In some embodiments, the predefined codebook may be obtained by training a specific learning network, which will be discussed in detail in the examples below.

At 220, the computing device 102 extracts a semantic feature of at least two consecutive text items of the set of text items based on the first vectorized representation. Each semantic feature indicates feature information of a subset of text items composed of at least two consecutive text items. At least two consecutive text items refer to text items that are next to each other in the review. A window of a predetermined length may continuously slide in a set of text items to obtain at least two consecutive text items therein, and corresponding semantic feature may be extracted based on the vectorized representation of the obtained text items. For example, for the review 114, the semantic feature of three consecutive text items "They are thicker", the semantic feature of the other three consecutive text items "are thicker than", may be extracted, or features of other consecutive text items may be extracted. These consecutive text items may be considered as different subsets of text items in a set of text items, and the subsets may overlap each other.

Each semantic feature may also be represented by a numerical value of a certain dimension. When the review is divided according to a specific granularity, the divided text items may not fully reflect the overall semantics of the review. For example, Chinese word segmentation may lead to the loss of some semantic features of text items, or a text item consisting of a single word composed of Latin Pinyin is difficult to reflect a semantic feature alone. By extracting the semantic features of a plurality of consecutive text items, it is possible to traverse the combinations of different strings, words or phrases in the review as much as possible in order to explore the semantic diversity brought about by these combinations. Therefore, the semantic features may also be referred to as a semantic diversity encoding of the review. The extraction of the semantic features may take a variety of approaches, one of which may be implemented by training a specific learning network, which will be discussed in detail in the example below. Of course, other feature extraction approaches are also feasible.

It may be appreciated that from the vectorized representation of the text item to the extraction of the semantic features, the semantic features are capable of characterizing different combinations of different text items in the review, thereby enabling consideration of the semantic diversity of the review from the phrase level. In some embodiments, the semantic diversity of the review may also be explored from more granularities. Specifically, the computing device 102 may further divide each text item to obtain subtext items of a finer granularity. For example, for an English review, after a plurality of words are obtained by dividing according to a word-level granularity, the words may be further divided according to a character-level granularity to obtain one or more characters (for example, the letters) constituting each word, and each character represents a subtext item. In another example, for a review of a language such as Chinese, Japanese, after a plurality of phrases are obtained by dividing according to a phrase-level granularity, the text items may be further divided according to a word-level granularity to obtain one or more words (e.g., Chinese or Japanese characters). At this point, each word represents a subtext item.

The computing device 102 may obtain a vectorized representation of subtext items (referred to as the second vectorized representation for case of description). Similar to the first vectorized representation, the second vectorized representation may also consist of a plurality of values of a certain dimension, and the similarity between the vectorized representations of different subtext items may also indicate the semantic similarity between the different subtext items. In some examples, a vectorized representation of a subtext item may be obtained from a predefined set of vector encodings (codebook). The predefined codebook may be vectorized representations of the text items determined after encoding the text items in the thesaurus. In some embodiments, the predefined codebook may be obtained by training a specific learning network, which will be discussed in detail in the examples below.

The computing device 102 may combine the first vectorized representation of the text item and the second vectorized representation of the subtext items that make up the text item to generate a combined vectorized representation. Thus, the combined vectorized representation corresponds one-to-one with the text items in the review. If the text item is identical to the subtext item (e.g., the text item includes only a single character or a single word) after performing the division separately by different granularities, then the first vectorized representation may be identical to the second vectorized representation. At this point, the two vectorized representations may also be combined. The computing device 102 may extract semantic features from the combined vectorized representation. The combined vectorized representation contains vector encodings corresponding to the text items of different granularity levels, and thus is more conducive to the exploration of the semantic diversity of the review.

In some embodiments, similar to the processing of the first vectorized representation of the text items, before combining, first, the semantic diversity of the review by combinations of different subtext items may further be explored at the second granularity level. Specifically, fine-granularity semantic features may be extracted from one or more subtext items obtained by dividing each text item. Each fine-granularity semantic feature may also be represented by a numerical value of a certain dimension. When a text item is divided into a plurality of subtext items, each fine-granularity semantic feature is associated with each subset of subtext items (including two or more consecutive subtext items) among all subtext items of the text item. In this way, combinations of different stems and affixes in each word or combinations of different words in the phases may be traversed as much as possible in order to explore the semantic diversity at the fine-granularity level. The extraction of fine-granularity semantic features may be similar to the extraction of the semantic features described above, which will also be discussed in detail below. In some embodiments, the first vectorized representation of each text item and the fine-granularity semantic features extracted from the subtext items that make up the text item may be combined to obtain a combined vectorized representation corresponding to the text item.

Each text item may be divided into a different number of subtext items (e.g., one or more subtext items). Thus, even if the pre-defined vectorized representation of each subtext item (or associated fine-granularity semantic feature) has the same dimension, the combined vectorized representations resulting from the combination may also be different in dimension. In some embodiments, for different text items, the second vectorized representations of the subtext items included therein are mapped to third vectorized representations having the same dimension, or the associated fine-granularity semantic features are mapped to other fine-granularity semantic features having the same dimension. On this basis, the first vectorized representations and the third vectorized representations (or other fine-granularity semantic features) may be combined to obtain combined vectorized representations having the same dimension.

With further reference to FIG. 2, at 230, the computing device 102 determines the degree of importance of the at least two consecutive text items in the context of the review. The combination of different consecutive text items may have a different degree of importance in the context of the review, and the contribution to the semantic understanding of the review is also different. The degree of importance may be set based on the actual determined semantic features, which will be discussed in detail in the example below. Since the feature information of each subset of text items is indicated by the semantic feature, the degree of importance of the subset of text items may also be considered as the degree of importance of the semantic feature. The degree of importance of the corresponding subset of text items may enable more attention to the related semantic feature when determining the value of the review, which helps to improve the accuracy of the review evaluation result. Such a mechanism may also be referred to as a "attention" mechanism.

At 240, the computing device 102 determines, based on the degree of importance and the semantic feature, the degree of the review helping a user to evaluate the target object, i.e., the value or usefulness of the review. In some embodiments, the degree of importance may be used to weight the semantic feature to obtain a combined feature, and then the degree of the review helping the user to evaluate the target object may be determined based on the combined feature. The mapping between the combined feature and the usefulness of the review may also be characterized by pre-training a specific learning network. The use of the degree of importance may make the semantic features characterizing the subset of text items having a higher importance have a higher contribution to the value evaluation result, and the semantic features that may be less effective may have a smaller impact on the value evaluation result. In this way, the accuracy of the evaluation result may be improved.

As mentioned above, the learning network may be used when extracting the semantic features, determining the degree of importance, and/or determining the degree of the review helping the user to evaluate the target object. In some embodiments, the vectorized representations of the text items and/or subtext items may also be determined by the learning network. Therefore, these processing learning networks may be combined into an architecture of an end-to-end learning network. The primary objective of the learning network is to determine the degree of a review helping the user to evaluate the target object from the input reviews as an output.

Figure 3:
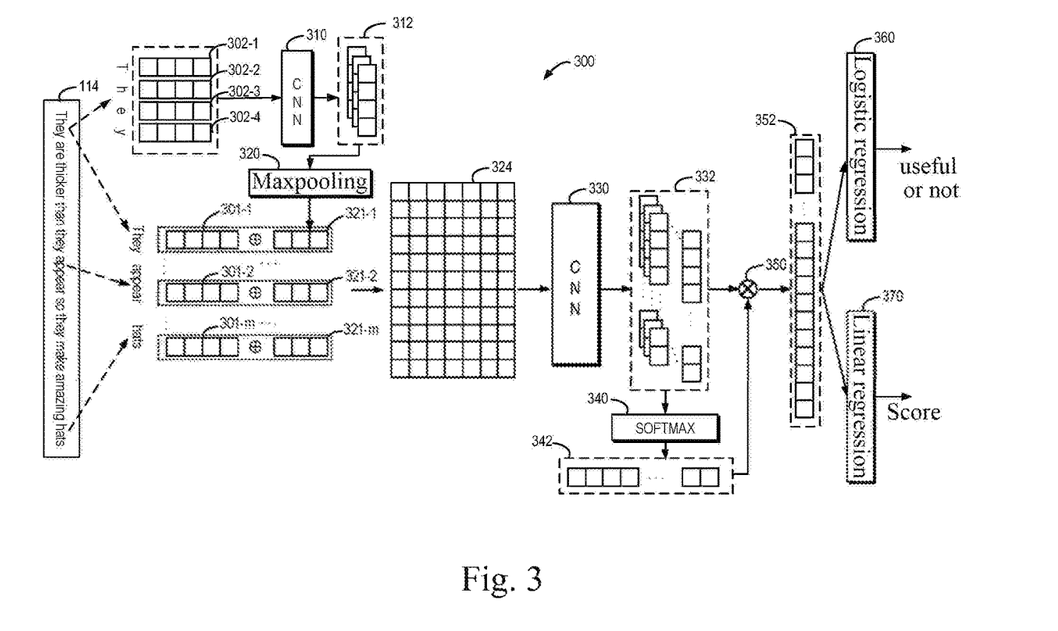
FIG. 3 illustrates a schematic diagram of an architecture of a learning network for evaluating a review according to some embodiments of the present disclosure.

FIG. 3 illustrates an exemplary architecture of a learning network 300 for evaluating a review according to some embodiments of the present disclosure. As used herein, the term "learning network" refers to a model that is capable of learning the correlation between the corresponding input and output from training data, so that after the training is completed, the given input is processed based on a parameter set obtained by training to generate the corresponding output. Sometimes, the "learning network" may also be referred to as a "neural network," "learning model," "network," or "model." These terms are used interchangeably herein.

The architecture of the learning network 300 shown in FIG. 3 may be implemented at the computing device 102 of FIG. 1. For ease of description, the exemplary architecture of FIG. 3 is described with reference to FIG. 1. It is assumed that the parameter set of the learning network 300 has been obtained through training and thus may be used to evaluate the value of a review. For ease of description, the review 114 of FIG. 1 is described as an example. During use, the computing device 102 obtains first vectorized representations 301-1, 301-2, . . . , 301-$m$ (collectively referred to as a vectorized representation 301) of text items in the review 114, where m indicates the number of text items in the review. Since the review 114 contains English content, the text items are words obtained by dividing the review 114 according to the word-level granularity, so that the first vectorized representation 301 represents the vectorized representations of the words, respectively, where m=11.

Assuming that a text item $v_i$ is at the $i^{th}$ index position in the m text items (for example, English words or Chinese words) included in the review to be evaluated, all the text items of the review may be represented as $v_{1:m}=[v_1, v_2, \ldots, v_m]$, and $v_{i:j}$ may represent consecutive text items from i to j, i.e., $v_{i:j}=[v_j, \ldots, v_j]$. Assuming that the vectorized representation of each text item $v_i$ is represented as a vectorized representation of dimension d (for ease, denoted as $v_i$), where $v_i \in \Re^d$, $\Re$ represents the real number field. The vectorized representation of the text item may be predetermined. If it is determined in advance that the num-ber of all different text items (for example, English words or Chinese words) of the vectorized representations is |V|, the matrix that can be constructed by the vectorized representations (vector encodings) of these text items is $V \in \Re^{d \times |V|}$, and the vectorized representation $v_i$ is mapped from V.

In some embodiments, as mentioned above, the second vectorized representation of one or more subtext items divided from the text item may also be obtained. In the example of the review 114, a vectorized representation of characters that make up each word may be obtained. For example, for the first word "They" in the review 114, a vectorized representation 302-1 of the character "T", a vectorized representation 302-2 of the character "h", a vectorized representation 302-3 of the character "e", and a vectorized representation 302-4 of the character "y" may be obtained. Such vectorized representations are also referred to as character set vectorized representations or vectorized encodings. For other words in the review 114, vectorized representations of characters included in these words may also be obtained accordingly. It may be appreciated that for a review including text such as Chinese, Japanese, vectorized representations at a single word level may be obtained.

Assuming that the text item contains n consecutive subtext items, which is marked as $u_{1:n}=[u_1, u_2, \ldots, u_n]$, where $u_j$ represents the $j^{th}$ subtext item in the text item $v_i$. Similar to the vectorized representation of the text item, the vectorized representation of the subtext item $u_j$ may be defined as $u_j \in \Re^{d'}$, i.e., the dimension of the vectorized representation of the subtext item is d'. It is also possible to define $u_{i:j}$, from the $i^{th}$ to the $j^{th}$ subtext items in the text item $v_i$, i.e., $u_{i:j}=[u_j, \ldots, u_j]$. The vectorized representation of the subtext item may be predetermined. If it is determined in advance that the number of all different subtext items (for example, characters or single words) of the vectorized representations is |U|, then the matrix that can be constructed by the vectorized representations of the subtext items is $U \in \Re^{d \times |U|}$, and the vectorized representation $u_j$ is mapped from U.

In some embodiments, the first vectorized representation at the first granularity level and the second vectorized representation at the second granularity level may be combined for extracting the semantic features of the review. Fine-granularity semantic features may be explored at the second granularity level prior to extracting the semantic features of the review, and for each text item having a different number of subtext items, the vectorized representations of the corresponding subtext items may also be mapped to the same dimension. In some embodiments, the exploration of the fine-granularity semantic diversity may be implemented by a sub-network 310 of the learning network 300. The sub-network 310 may be composed of one or more convolution filters and thus may be referred to as Convolution Learning Network (CNN) 310.

Assuming that the sub-network 310 includes k' convolution filters, which is represented as $W'=[w'_1, w'_2, \ldots, w'_{k'}]$, where $w'_i \in \Re^{d' \times l'}$ represents parameters of the filters. The filters are capable of convolving a sequence of continuous length l' (i.e., the vectorized representation of l' consecutive subtext items), and $i \in [1, \ldots, k']$. Using the convolution filters, information in the vectorized representation $u_{j:j+l'-1}$ of a sequence of subtext items of continuous length l' may be mapped to a scalar value $p_{i,j}$ by a convolution (inner product) operation, and is represented as follows:

$$p_{i,j} = \tan h(w'_i \cdot u_{j:j+l'-1} + b'), \qquad (1)$$

Here, b' is an offset parameter, and both $w'_i$ and b' belong to a part of the parameter set in the learning network 300.

If the vectorized representations $u_{1:n}$ of the subtext items in each text item $v_i$ is scanned by the convolution filter corresponding to $w'_i$, a vector $p_i$ having a dimension of $n+l'-1$ may be obtained. After performing a convolution operation on the vectorized representations $u_{1:n}$ of the subtext items in each text item $v_i$ using the k' filters in the sub-network 310, a fine-granularity semantic feature 312 may be obtained, represented as $P=[p_1^T, p_2^T, \ldots, p_{k'}^T]^T$.

In order to generate features of the same dimension for each text item $v_i$, the fine-granularity semantic feature 312 may be filtered (e.g., upsampled or downsampled). In the example of FIG. 3, the fine-granularity semantic feature 312 is mapped to vectorized representations of the same dimension (i.e., a third vectorized representation) 321-1, 321-2, ... 321-$m$ (collectively referred to as a vectorized representation 321) using a Maxpooling sub-network 320 in the learning network 300. These vectorized representations correspond to m text items, respectively. In an example, the Maxpooling sub-network 320 performs a maxpooling operation on each fine-granularity semantic feature 312 to obtain the vectorized representation 321, which is represented as:

$$h=[\max(p_1^T), \max(p_2^T), \ldots, \max(p_{k'}^T)]^T \quad (2)$$

Here, max(x) represents the maximum value in x. For each text item $v_i$, a vectorized representation 321 of dimension k' may be obtained, regardless of the number n of subtext items contained in the text item itself.

In order to extract the semantic features of the review, the learning network 300 combines the vectorized representation 301 of the first granularity level with the vectorized representation 321 of the second granularity level to obtain a combined vectorized representation 324, which may be represented as $e_i = v_i \oplus h_i$, where $h_i$ represents the vectorized representation 321 corresponding to the text item $v_i$, and $e_i \in \Re^{(d+k')}$. Thus, for the entire review, all of the combined vectorized representations may be represented as:

$$e_{1:m} = [e_1, e_2, \ldots, e_m] \quad (3)$$

The semantic diversity feature of the review 114 may be extracted from the combined vectorized representation 324. This may be implemented by a sub-network 330 of the learning network 300. Similar to the sub-network 310, the sub-network 330 may include one or more convolution filters to implement feature extraction, and thus may be referred to as CNN 330.

Assuming that the sub-network 310 includes k convolution filters, which is represented as $W=[w_1, w_2, \ldots, w_k]$, where $w_i \in \Re^{(d+k') \times l}$ ($j \in [1, \ldots, k]$) represents parameters of the filters. The filters are capable of convolving a sequence of continuous length l (i.e., a combined vectorized representation corresponding to l consecutive subtext items). A combined vectorized representation $e_{j:j+l-1}$ of length l may be sequentially scanned on $e_{1:m}$ using the filter $w_i$ to perform a convolution (inner product) operation on the combined vectorized representation. After performing the convolution operation on the combined vectorized representation $e_{1:m}$ using all k convolution filters in CNN 330, a semantic feature 332 of the review 114 is obtained, represented as Q.

The semantic feature 332 Q may be represented as a matrix, where elements on the $i^{th}$ row and the $j^{th}$ column are:

$$q_{i,j} = \tan h(w_i \cdot e_{j:j+l-1} + b) \quad (4)$$

Here, b is an offset parameter and both $w_i$ and b belong to a part of the parameter set in the learning network 300.

The combined vectorized representation of each column of the semantic feature 332 Q represents the semantic features (or semantic diversity encodings) by k consecutive convolution filters of the consecutive l combined vectorized representations $e_{j:j+l-1}$ of the review 114. In a review containing m text items, the number of such consecutive combined vectorized representations is m-l+1. Thus, the semantic feature 332 Q may be represented as $Q=[q_1, q_2, \ldots, q_{m-l+1}]$, where each $q_j$ represents the semantic feature of a consecutive l combined vectorized representations $e_{j:j+l-1}$. The feature is associated with the text items corresponding to the l combined vectorized representations.

Since a subset of text items (a plurality of consecutive text items) corresponding to a plurality of semantic features 332 may differ in contribution to the semantic understanding of the review 114 in the context of the review 114, in the embodiments of the present disclosure, the degree of importance of the subset of text items corresponding to each semantic feature 332 in the context of the review 114 is also determined. This degree of importance, in turn, may also characterize the degree of importance of the semantic feature 332.

The determination of the degree of importance may be achieved by a sub-network 340 in the learning network 300. The sub-network 340 takes the semantic feature 332 as an input to determine the corresponding weight value that is used to represent a degree of importance 342 of the subset of text items corresponding to the semantic feature 332. In some embodiments, the sub-network 340 may perform a softmax operation on the input semantic feature 332 using a softmax function to output the corresponding weight value (denoted as weight vector a) as the degree of importance 342. The processing in the sub-network 340 is represented as:

$$a_i = \text{softmax}(r^T \tan h(W_a q_i)) \quad (5)$$

Here, $W_a$ and r are parameters of the sub-network 340 and are also part of the parameter set of the learning network 300; and $a_i$ represents the degree of importance of the subset of text items corresponding to the semantic feature 332, in the weight vector a. The use of the softmax function causes the sum of the elements in the weight vector a to be 1. Of course, the sub-network 340 may also select other functions to process the semantic feature 332 to determine the corresponding weight value to quantify the degree of importance.

The learning network 300 also includes a combiner 350 for weighting the semantic feature 332 using the degree of importance 342 to generate a combined feature 352 of the review 114. The weighting may be represented as:

$$x = \sum_{i=1}^{m-l+1} a_i q_i \quad (6)$$

Here, x represents the combined feature 352.

The combined feature 352 may be used to determine the degree of the review 114 helping the user to evaluate the target object. In the example of FIG. 3, assuming that the learning network 300 determines for each review whether the review helps the user to evaluate the target object, the learning network 300 may be considered to complete a two-category task (yes, no). In this case, the learning network 300 may include a logistic regression model 360 for determining whether the review 114 is useful. In the example of the review 114, it may be determined that the review 114 is useful, i.e., the review 114 helps other users to evaluate the target object.

The logistic regression model 36 may perform a logistic regression operation on the combined feature 352, which is represented as:

$$\hat{y} = \frac{1}{1 + \exp - (w_y^T x + b_y)} \quad (7)$$

Here, $\hat{y}$ represents the judged probability of the value of the review 114 by the learning network 300, based on which whether the review 114 is valuable may be determined. Moreover, $w_y$ and $b_y$ are the predetermined parameter and offset of the logistic regression model 360, respectively, which are also part of the overall parameter set of the learning network 300.

It may be appreciated that in other embodiments, other models may be employed to determine the value of the review 114 from the combined feature. For example, if it is desired to quantify (e.g., quantize to a range) the value of the review 114, the combined feature 352 may be processed using a linear regression model. The embodiments of the present disclosure are not limited in this regard.

The above discusses how the learning network 300 may be used to determine the value of a review in the event that the parameter set of the learning network 300 has been obtained by training. The training process of the learning network 300 will be described below. The purpose of the training process is to continuously optimize the parameter set of the learning network from the initial value to achieve a certain convergence condition (i.e., learning objective). Training of the learning network 300 may be implemented by the computing device 102. Of course, in other embodiments, the learning network 300 may also be trained by other devices than the computing device 102 for use by the computing device 102.

In the learning network 300 of FIG. 3, the parameter set that needs to be determined through the training process includes: a parameter W' of a set of filters in the CNN 310 and an offset parameter b' when each filter performs a convolution operation (the offset parameters of the respective filters may be the same or different); a parameter W of a set of filters in the sub-network CNN 330 and an offset parameter b when each filter performs a convolution operation (the offset parameters of the respective filters may be the same or different); parameters $W_a$ and r of the sub-network 340 for determining the degree of importance; parameters $w_y$ and $b_y$ of the logistic regression model 360. In the learning network 300, there are also some parameters that may be automatically or manually set as fixed values, such as the parameters l, l', k, k', d and d'. These parameters may be referred to as hyperparameters.

At the beginning phase of the training, the parameter set of the learning network 300 is initialized. Random initialization may be used to set the initial value of each parameter. Alternatively, for some parameters or sub-networks, pre-trained parameter values may be obtained as the initial values.

In some embodiments, a vectorized representation of the text item and/or the subtext items may also be considered as a parameter to be optimized. In this way, a vectorized representation that is more helpful in determining the value evaluation result in the context of the review value evaluation may be determined by the training process. While optimizing the parameter sets of the various parts of the learning network 300, the vectorized representation of the text item and/or subtext items is also continuously updated and optimized to determine the final vectorized representation.

In the training process, a training review for a training object and a target degree (reality degree) of the training review helping the user to evaluate the training object are obtained. Then, the parameter set of the learning network 300 is optimized based on the training review and the target degree. The convergence condition of parameter set optimization may be achieved by setting a loss function. Since the primary objective of the learning network 300 is to learn the ability to determine whether a review is valuable from the input reviews, the loss function (represented as $\mathcal{L}_y$) may be determined as the error between a result that can be determined by the learning network 300 and the target result after each parameter optimization, which is represented as:

$$\mathcal{L}_y = \sum_{i=1}^{N} (y_i - 1)\log(1 - \hat{y}_i) - y_i \log(\hat{y}_i) \quad (8)$$

Here, N represents the number of training samples, i.e., the number of training reviews; $y_i$ represents the real result (the target degree of the training review helping the user to evaluate the training object) associated with the $i^{th}$ training review, and $\hat{y}_i$ represents the result (the predicted degree of the training review helping the user to evaluate the training object) determined by the learning network 300 for the $i^{th}$ training review based on the current parameter set.

In the training process, various learning algorithms (e.g., stochastic gradient descent algorithm, backward propagation algorithm, etc.) may be used to continuously optimize the parameter set of the learning network 300, so that the error between the predicted degree and the target degree is continuously reduced, thereby continuously reducing the loss function $\mathcal{L}_y$. If the loss function $\mathcal{L}_y$ reaches convergence (e.g., the error reaches a predetermined threshold range, or the loss function is reduced to a small value or minimized, or a predetermined number of iterations is reached), the parameter set of the current learning network 300 is defined as the trained parameter set.

In the above training process, the convergence condition (i.e., the learning objective) of the training is based only on an expected output of the learning network 300 (i.e., an evaluation of whether the review is useful). In some implementations, an auxiliary learning objective may also be set while training the learning network 300. Typically, when a reviewer makes a review on a particular object, he/she also subjectively rates the object, such as specifying a certain range of scores for expressing the reviewer's satisfaction with the particular object. Such subjective rating may be stored in association with the review. In some embodiments, when obtaining the training data of the learning network 300, a target score of the training object by the reviewer of the training review may be obtained. Then, the auxiliary learning objective of the learning network 300 is set such that the learning network 300 can determine the score associated with the review from the input training reviews.

In order to achieve the auxiliary learning objective, the linear regression model 370 (as shown in FIG. 3) is added to the learning network 300 during training. The linear regression model 370 takes the combined feature 352 as an input (with the logistic module 360) and perform linear regression on the combined feature 352 to evaluate the score of the particular target by the reviewer of the input review (within a predetermined range of values). The linear regression operation in the linear regression model 370 may be represented as:

$$\hat{z} = w_z^T x + b_z \quad (9)$$

Here, $\hat{z}$ represents the scoring result determined by the linear regression model 370 in the learning network 300, and $w_z$ and $b_z$ are the parameter and offset of the linear regression model 370, respectively.

In the process of training the learning network 300, the values of $w_z$ and $b_z$ are further optimized to enable the linear regression model 370 to correctly evaluate the reviewer's score. Based on the auxiliary learning objective, the convergence condition of the parameter set optimization of the learning network 300 may also be related to another loss function (represented as $\mathcal{L}_z$) indicating the error between a score determined by the linear regression model 370 and the true (target) review, which is represented as:

$$\mathcal{L}_z = \sum_{i=1}^{N} (z_i - \hat{z}_i)^2 \quad (10)$$

Here, N represents the number of training samples, $z_i$ represents the true result (target score) associated with the $i^{th}$ training sample, and $\hat{z}_i$ represents the result (i.e., the predicted score of the training subject by the reviewer of the $i^{th}$ training review) determined by the learning network 300 for the $i^{th}$ training review on the basis of the current parameter set.

The loss function $\mathcal{L}_y$ associated with the primary learning objective and the loss function $\mathcal{L}_z$ associated with the auxiliary learning objective may be combined to form the overall loss function of the learning network 300 (represented as $\mathcal{L}$):

$$\mathcal{L} = \lambda \mathcal{L}_y + (1-\lambda) \mathcal{L}_z \quad (11)$$

Here, $\lambda$ is a preset value, with a value range from 0 to 1.

In the training process, various learning algorithms may be used to continuously optimize the parameter set of the learning network 300, thereby not only reducing the estimation error of the value degree of the training review, but also reducing the estimation error of the scoring of the training review, thereby continuously reducing the overall loss function $\mathcal{L}$. If the loss function $\mathcal{L}$ reaches convergence (e.g., the error reaches a predetermined threshold range, or the loss function is reduced to a small value or minimized, or a predetermined number of iterations is reached), the parameter set of the current learning network 300 is defined as the trained parameter set.

By training the learning network 300 using the auxiliary learning objective associated with the score estimation in conjunction with the primary learning objective associated with the review value estimation, correct learning of the parameter values of the learning network 300 may be facilitated under the constraint of a plurality of learning objectives.

It may be appreciated that the linear regression model 370 may be used for the purpose of assisting training in the training process of the learning network 300. After the training of the learning network 300 is completed, the module may be discarded and only the learning network 300 is used to evaluate whether an input review is useful (valuable). Of course, in some embodiments, the linear regression module 370 may also be kept to enable the learning network 300 to additionally determine the score associated with the input review.

According to the embodiments of the present disclosure, an efficient and accurate automatic evaluation of the value (degree of usefulness) of a review may be achieved. In addition, the use cost is saved since the content of the review may be used directly as an input without excessive preprocessing with additional linguistic analysis tools. Furthermore, by performing processing such as mapping text information to a vectorized representation, differences between languages may be effectively avoided, reducing the limitations of the embodiments of the present disclosure.

Based on an actual application scenario, the evaluation result may be used for a variety of purposes. For example, in some applications, reviews of a particular object on an Internet platform or website may be evaluated so that reviews tagged as "useful" or "valuable" may be given priority and displayed. The useful reviews that are displayed given priority may help other users quickly capture useful information from numerous reviews, enabling them to understand or evaluate the various aspects of the particular object. In some other applications, other decisions, such as a recommendation decision for the particular object, may also be executed based on the evaluation result of the reviews for the particular object. It should be understood that the above are only some exemplary applications of the evaluation result, and the embodiments of the present disclosure are not limited in this respect.

Figure 4:
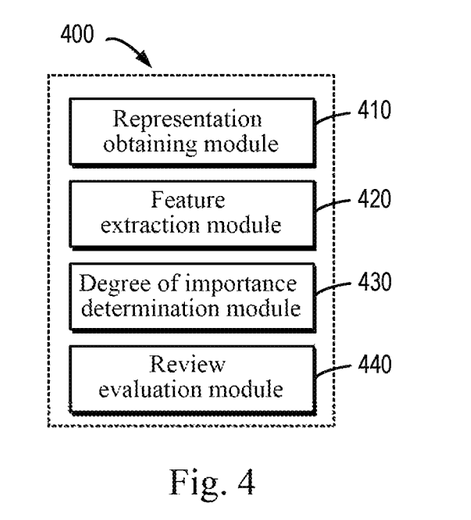
FIG. 4 illustrates a schematic block diagram of an apparatus for evaluating a review according to an embodiment of the present disclosure.

FIG. 4 illustrates a schematic block diagram of an apparatus 400 for evaluating a review according to an embodiment of the present disclosure. The apparatus 400 may be included in the computing device 102 of FIG. 1 or implemented as the computing device 102. As shown in FIG. 4, the apparatus 400 includes a representation obtaining module 410, configured to obtain a first vectorized representation of a set of text items in a review for a target object. The apparatus 400 further includes a feature extraction module 420, configured to extract a semantic feature of at least two consecutive text items of the set of text items based on the first vectorized representation. The apparatus 400 further includes a degree of importance determination module 430, configured to determine a degree of importance of the at least two consecutive text items in a context of the review. In addition, the apparatus 400 further includes a review evaluation module 440, configured to determine a degree of the review helping a user to evaluate the target object, based on the degree of importance and the semantic feature.

In some embodiments, the feature extraction module 420 may include: an obtaining module, configured to obtain a second vectorized representation of subtext items in the set of text items; a combination module, configured to combine the first vectorized representation and the second vectorized representation to generate a combined vectorized representation; and an extraction module, configured to extract the semantic feature from the combined vectorized representation.

In some embodiments, each text item may include a word in the review, and each subtext item may include a character that makes up a word. In some embodiments, each text item may include a set of words in the review, and each subtext item may include a single word.

In some embodiments, the review evaluation module 440 may include: a weighting module, configured to weight the semantic feature with the degree of importance to generate a combined feature of the review; and a determination module, configured to determine the degree of the review helping the user to evaluate the target object based on the combined feature.

In some embodiments, a learning network may be utilized to perform at least one of the following: the feature extraction module 420, the degree of importance determination module 430, or the review evaluation module 440.

In some embodiments, the apparatus 400 may further include: a training data obtaining module, configured to obtain a training review for a training object and a target degree of the training review helping the user to evaluate the training object; and a parameter determination module, configured to determine a parameter set of the learning network based on the training review and the target degree, such that an error between a predicted degree of the training review helping the user to evaluate the training object determined using the learning network and the target degree is within a first error threshold.

In some embodiments, the training data obtaining module may be further configured to obtain a target score of the training object by a reviewer of the training review. In some embodiments, the parameter determination module may be further configured to determine the parameter set of the learning network based on the target score, such that an error between a predicted score of the training object by the reviewer determined using the learning network and the target score is within a second error threshold.

In some embodiments, the apparatus 400 may further include: an initial value obtaining module, configured to obtain an initial vectorized representation of text items included in the training review; and a vectorized representation updating module, configured to update the initial vectorized representation while determining the parameter set to obtain the first vectorized representation.

Figure 5:
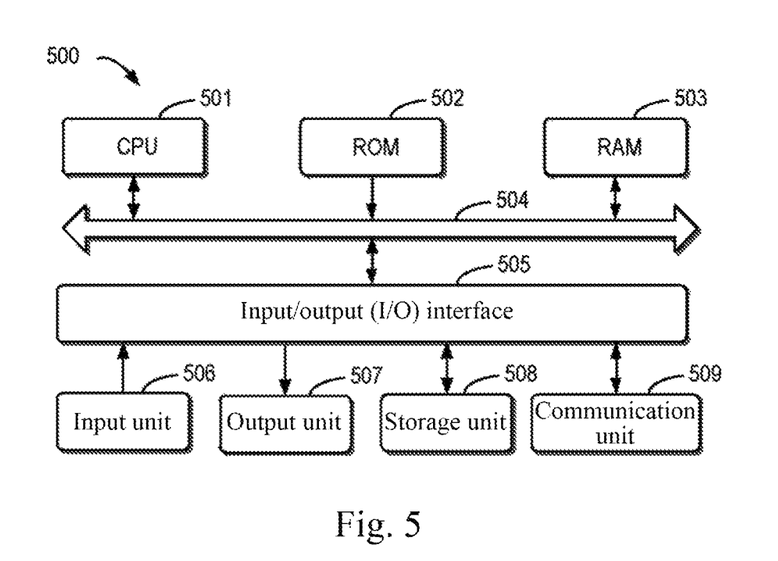
FIG. 5 illustrates a block diagram of a computing device capable of implementing the embodiments of the present disclosure.

FIG. 5 is a schematic block diagram of an exemplary device 500 capable of implementing the embodiments of the present disclosure. The device 500 may be used to implement the computing device 102 shown in FIG. 1. As shown in the drawing, the device 500 includes a central processing unit (CPU) 501 that may perform various appropriate actions and processing in accordance with computer program instructions stored in a read only memory (ROM) 502 or computer program instructions loaded into a random access memory (RAM) 503 from a storage unit 508. In the RAM 503, various programs and data required for the operation of the device 500 may also be stored. The CPU 501, the ROM 502, and the RAM 503 are connected to each other through a bus 504. An input/output (I/O) interface 505 is also coupled to the bus 504.

A plurality of components in the device 500 are coupled to the I/O interface 505, including: an input unit 506, for example, a keyboard or a mouse; an output unit 507, for example, various types of displays or speakers; a storage unit 508, for example, a disk or an optical disk; and a communication unit 509, for example, a network card, a modem, or a wireless communication transceiver. The communication unit 509 allows the device 500 to exchange information/data with other devices over a computer network such as the Internet and/or various telecommunication networks.

The processing unit 501 performs the various methods and processes described above, for example, the process 200. For example, in some embodiments, the process 200 may be implemented as computer software programs tangibly embodied in a machine readable medium, for example, the storage unit 508. In some embodiments, some or all of the computer programs may be loaded and/or installed onto the device 500 via the ROM 502 and/or the communication unit 509. When a computer program is loaded into the RAM 503 and executed by the CPU 501, one or more of steps of the process 200 described above may be performed. Alternatively, in other embodiments, the CPU 501 may be configured to perform the process 200 by any other suitable means (e.g., by means of firmware).

The functions described herein above may be performed, at least in part, by one or more hardware logic components. For example, without limitation, illustrative types of hardware logic components that may be used include: a field programmable gate array (FPGA), an application specific integrated circuit (ASIC), an application specific standard product (ASSP), a system on a chip (SOC), a complex programmable logic device (CPLD), or the like.

Program codes for implementing the method of the present disclosure may be written in any combination of one or more programming languages. These program codes may be provided to a processor or controller of a general purpose computer, special purpose computer or other programmable data processing apparatuses such that the program codes, when executed by the processor or controller, enables the functions/operations specified in the flowcharts and/or block diagrams to be implemented. The program codes may be executed entirely on a computer, executed partially on the computer, used as a standalone software package partially executed on the computer and partially executed on a remote computer, or executed entirely on the remote computer or a server.

In the context of the present disclosure, the machine readable medium may be a tangible medium that may contain or store programs for use by or in connection with an instruction execution system, apparatus, or device. The machine readable medium may be a machine readable signal medium or a machine readable storage medium. The machine readable medium may include, but not limited to, an electronic, magnetic, optical, electromagnetic, infrared, or semiconductor system, apparatus, or device, or any suitable combination of the foregoing. More specific examples of the machine readable storage medium may include an electrical connection based on one or more wires, a portable computer disk, a hard disk, a random access memory (RAM), a read only memory (ROM), an erasable programmable read only memory (EPROM or flash memory), an optical fiber, a portable compact disk read only memory (CD-ROM), an optical storage device, a magnetic storage device, or any suitable combination of the foregoing.

In addition, although various operations are described in a specific order, this should be understood as that such operations are required to be performed in the specific order shown or in sequential order, or all illustrated operations should be performed to achieve the desired result. Multitasking and parallel processing may be advantageous in certain circumstances. Likewise, although several specific implementation details are included in the above discussion, these should not be construed as limiting the scope of the present disclosure. Certain features described in the context of separate embodiments may also be implemented in combination in a single implementation. Conversely, various features described in the context of a single implementation may also be implemented in a plurality of implementations, either individually or in any suitable sub-combination.

Although the subject matter is described in language specific to structural features and/or method logic actions, it should be understood that the subject matter defined in the appended claims is not limited to the specific features or actions described above. Instead, the specific features and actions described above are merely illustrative forms of implementing the claims.

What is claimed is:

1. A method for evaluating a review, the method comprising:
   obtaining a first vectorized representation of a set of text items in a review for a target object;
   extracting a semantic feature of at least two consecutive text items of the set of text items based on the first vectorized representation;
   determining a degree of importance of the at least two consecutive text items in a context of the review;
   determining a degree of the review helping a user to evaluate the target object, based on the degree of importance and the semantic feature;
   obtaining a training review for a training object and a target degree of the training review helping the user to evaluate the training object; and
   determining a parameter set of a learning network based on the training review and the target degree, such that an error between a predicted degree of the training review helping the user to evaluate the training object determined using the learning network and the target degree is within a first error threshold, wherein the learning network is utilized to perform at least one of: the extracting of the semantic feature, the determining of the degree of importance, or the determining of the degree of the review helping the user to evaluate the target object.

2. The method according to claim 1, wherein extracting the semantic feature comprises:
   obtaining a second vectorized representation of subtext items in the set of text items;
   combining the first vectorized representation and the second vectorized representation to generate a combined vectorized representation; and
   extracting the semantic feature from the combined vectorized representation.

3. The method according to claim 2, wherein each text item comprises a word in the review, and each subtext item comprises a character that makes up a word.

4. The method according to claim 2, wherein each text item comprises a set of words in the review, and each subtext item comprises a single word.

5. The method according to claim 1, wherein the determining a degree of the review helping a user to evaluate the target object comprises:
   weighting the semantic feature with the degree of importance to generate a combined feature of the review; and
   determining the degree of the review helping the user to evaluate the target object based on the combined feature.

6. The method according to claim 1, wherein determining the parameter set of the learning network further comprises:
   obtaining a target score of the training object by a reviewer of the training review; and
   determining the parameter set of the learning network based on the target score, such that an error between a predicted score of the training object by the reviewer determined using the learning network and the target score is within a second error threshold.

7. The method according to claim 1, further comprising:
   obtaining an initial vectorized representation of text items included in the training review; and
   updating the initial vectorized representation while determining the parameter set to obtain the first vectorized representation.

8. An apparatus for evaluating a review, the apparatus comprising:
   at least one processor; and
   a memory storing instructions, the instructions when executed by the at least one processor, cause the at least one processor to perform operations, the operations comprising:
   obtaining a first vectorized representation of a set of text items in a review for a target object;
   extracting a semantic feature of at least two consecutive text items of the set of text items based on the first vectorized representation;
   determining a degree of importance of the at least two consecutive text items in a context of the review;
   determining a degree of the review helping a user to evaluate the target object, based on the degree of importance and the semantic feature;
   obtaining a training review for a training object and a target degree of the training review helping the user to evaluate the training object; and
   determining a parameter set of a learning network based on the training review and the target degree, such that an error between a predicted degree of the training review helping the user to evaluate the training object determined using the learning network and the target degree is within a first error threshold, wherein the learning network is utilized to perform at least one of: the extracting of the semantic feature, the determining of the degree of importance, or the determining of the degree of the review helping the user to evaluate the target object.

9. The apparatus according to claim 8, wherein the extracting the semantic feature comprises:
   obtaining a second vectorized representation of subtext items in the set of text items;
   combining the first vectorized representation and the second vectorized representation to generate a combined vectorized representation; and
   extracting the semantic feature from the combined vectorized representation.

10. The apparatus according to claim 9, wherein each text item comprises a word in the review, and each subtext item comprises a character that makes up a word.

11. The apparatus according to claim 9, wherein each text item comprises a set of words in the review, and each subtext item comprises a single word.

12. The apparatus according to claim 8, wherein the determining a degree of the review helping a user to evaluate the target object comprises:
   weighting the semantic feature with the degree of importance to generate a combined feature of the review; and
   determining the degree of the review helping the user to evaluate the target object based on the combined feature.

13. The apparatus according to claim 8, wherein determining the parameter set of the learning network further comprises:
   obtaining a target score of the training object by a reviewer of the training review; and
   determining the parameter set of the learning network based on the target score, such that an error between a predicted score of the training object by the reviewer determined using the learning network and the target score is within a second error threshold.

14. The apparatus according to claim 8, the operations further comprising:
  obtaining an initial vectorized representation of text items included in the training review; and
  updating the initial vectorized representation while determining the parameter set to obtain the first vectorized representation.

15. A non-transitory computer readable storage medium, storing a computer program thereon, the program, when executed by a processor, causes the processor to perform operations, the operations comprising:
  obtaining a first vectorized representation of a set of text items in a review for a target object;
  extracting a semantic feature of at least two consecutive text items of the set of text items based on the first vectorized representation;
  determining a degree of importance of the at least two consecutive text items in a context of the review;
  determining a degree of the review helping a user to evaluate the target object, based on the degree of importance and the semantic feature;
  obtaining a training review for a training object and a target degree of the training review helping the user to evaluate the training object; and
  determining a parameter set of the learning network based on the training review and the target degree, such that an error between a predicted degree of the training review helping the user to evaluate the training object determined using the learning network and the target degree is within a first error threshold.

* * * * *